(12) United States Patent
Kim et al.

(10) Patent No.: US 8,597,861 B2
(45) Date of Patent: Dec. 3, 2013

(54) METHOD FOR MANUFACTURING COLOR FILTER AND COLOR FILTER MANUFACTURED BY USING THE SAME

(75) Inventors: Dae-Hyun Kim, Goyang-si (KR); Dong-Chang Choi, Daejeon (KR); Kyung-Soo Choi, Hanam-si (KR); Ho-Chan Ji, Daejeon (KR); Hyun-Sik Kim, Daejeon (KR); Geun-Young Cha, Daejeon (KR); Sung-Hyun Kim, Daejeon (KR); Jae-Joon Kim, Daejeon (KR); Min-A Yu, Daejeon (KR); Mi-Ae Kim, Daejeon (KR); Mi-Kyoung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 732 days.

(21) Appl. No.: 12/450,549

(22) PCT Filed: Mar. 6, 2008

(86) PCT No.: PCT/KR2008/001281
§ 371 (c)(1),
(2), (4) Date: Sep. 30, 2009

(87) PCT Pub. No.: WO2008/123661
PCT Pub. Date: Oct. 16, 2008

(65) Prior Publication Data
US 2010/0062377 A1 Mar. 11, 2010

(30) Foreign Application Priority Data
Apr. 5, 2007 (KR) .................. 10-2007-0033671

(51) Int. Cl.
*G02B 5/20* (2006.01)
(52) U.S. Cl.
USPC .............................................. 430/7
(58) Field of Classification Search
None
See application file for complete search history.

(56) References Cited

U.S. PATENT DOCUMENTS

| | | | |
|---|---|---|---|
| 6,455,209 B1 | 9/2002 | Okaniwa et al. | |
| 6,677,243 B2 | 1/2004 | Okada et al. | |
| 7,014,521 B1 | 3/2006 | Fujiike et al. | |
| 8,137,873 B2 * | 3/2012 | Kim et al. | 430/7 |
| 2002/0014470 A1 | 2/2002 | Okada et al. | |
| 2006/0036023 A1 | 2/2006 | Kamata et al. | |
| 2006/0216617 A1 * | 9/2006 | Kiguchi et al. | 430/7 |
| 2008/0113282 A1 * | 5/2008 | Andoh et al. | 430/7 |
| 2010/0233595 A1 * | 9/2010 | Takahashi et al. | 430/7 |

FOREIGN PATENT DOCUMENTS

| | | |
|---|---|---|
| CN | 1336567 | 2/2002 |
| CN | 1726434 | 1/2006 |
| JP | 06-347637 | 12/1994 |
| JP | 09-203803 | 8/1997 |
| JP | 2000-258622 | 9/2000 |
| JP | 2001-200178 | 7/2001 |
| JP | 2001-272522 | 10/2001 |
| JP | 2006-209140 | 8/2006 |
| JP | 2006-251433 | 9/2006 |
| JP | 2006-267821 | 10/2006 |
| JP | 2007-25427 | 2/2007 |
| KR | 10-2000-0047958 | 7/2000 |
| KR | 10-2001-0021216 | 3/2001 |
| KR | 10-2001-0070396 | 7/2001 |
| KR | 10-2001-0110183 | 12/2001 |
| KR | 10-2006-0094434 | 8/2006 |
| WO | WO2006/098575 | 9/2006 |
| WO | WO-2007/108367 | * 9/2007 |
| WO | WO/2008/094010 | * 8/2008 |

OTHER PUBLICATIONS

English translation Miura et al. JP-2007-025427(Jan. 2007).*

* cited by examiner

*Primary Examiner* — John A. McPherson
(74) *Attorney, Agent, or Firm* — McKenna, Long & Aldridge, LLP

(57) ABSTRACT

The present invention relates to a method for manufacturing a color filter and a color filter manufactured by using the same. More particularly, the present invention pertains to a method for manufacturing a color filter, which includes performing plasma treatment of a black matrix (BM) pattern formed on a substrate to increase a difference in ink repellency of the black matrix pattern and a pixel unit, and a color filter manufactured by using the same. When the production method of the present invention is used, it is possible to provide the color filter in which color mixing does not occur in a pixel unit or between pixel units during discharging of ink by using an inkjet printing process, discoloration due to unfilling does not occur, a surface is uniform, and there is an insignificant step in the pixel unit or between the pixel units.

15 Claims, 3 Drawing Sheets

Fig. 1

| BM pattern | Color ink | Jetting result of ink | BM pattern | Color ink | Jetting result of ink |
|---|---|---|---|---|---|
| BM1 | Ink1 (5 Drops) | | BM1 | Ink2 (5 Drops) | |
| BM2 | Ink1 (20 Drops) | | BM2 | Ink2 (20 Drops) | |
| BM3 | Ink1 (20 Drops) | | BM3 | Ink2 (20 Drops) | |
| BM4 | Ink1 (5 Drops) | | BM4 | Ink2 (5 Drops) | |
| BM5 | Ink1 (20 Drops) | | BM5 | Ink2 (20 Drops) | |
| BM6 | Ink1 (5 Drops) | | BM6 | Ink2 (5 Drops) | |
| BM7 | Ink1 (20 Drops) | | BM7 | Ink2 (20 Drops) | |
| BM2 | Ink3 (10 Drops) | | BM6 | Ink4 (5 Drops) | |

Fig. 2

| | BM pattern | Color ink | Jetting result of ink |
|---|---|---|---|
| Example 1 | BM5 | Ink1 | |
| Example 2 | BM2 | Ink2 | |
| Example 3 | BM4 | Ink2 | |
| Example 4 | BM5 | Ink3 | |
| Example 5 | BM6 | Ink2 | |
| Example 6 | BM2 | Ink3 | |
| Example 7 | BM6 | Ink3 | |

Fig. 3

| | BM pattern | Color ink | Jetting result of ink |
|---|---|---|---|
| Comparative example 1 | BM3 | Ink1 | |
| Comparative example 2 | BM7 | Ink1 | |
| Comparative example 3 | BM1 | Ink2 | |
| Comparative example 4 | BM3 | Ink2 | |
| Comparative example 5 | BM7 | Ink2 | |

METHOD FOR MANUFACTURING COLOR FILTER AND COLOR FILTER MANUFACTURED BY USING THE SAME

TECHNICAL FIELD

The present invention relates to a method for manufacturing a color filter and a color filter manufactured by using the same. More particularly, the present invention pertains to a method for manufacturing a color filter, which includes performing plasma treatment of a black matrix (BM) pattern formed on a substrate to increase a difference in ink repellency of the black matrix pattern and a pixel unit, and a color filter manufactured by using the same.

This application claims priority from Korean Patent Application No. 10-2007-033671 filed on Apr. 5, 2007 in the KIPO, the disclosure of which is incorporated herein by reference in its entirety.

BACKGROUND ART

In general, fine patterns which are used in display devices such as semiconductor circuit devices and LCDs (Liquid Crystal Display) are formed according to a photolithography process by using a photoresist. In connection with this, the photoresist is applied on the substrate, exposed, developed, washed, and cured to produce the fine pattern.

Even though the photolithography process is advantageous in that desired patterns are precisely obtained, there are disadvantages in that many steps are performed, various types of materials are used in order to maximize the effect of the photoresist, and a great amount of photoresist is used during processes such as a coating process.

In recent, a method for obtaining a fine pattern by using an inkjet printing process has been suggested in order to avoid the disadvantages of the photolithography process.

With respect to the production of the color filter by using the inkjet printing process, a black matrix pattern which is a light blocking part is formed by using a known photolithography process, and three types of ink having red, green, and blue colors (hereinafter, the red color is designated by R, the green color is designated by B, and the blue color is designated by B) are jetted into pixel units which are defined by the black matrix patterns used as partitions.

In connection with this, if the black matrix pattern used as the partition does not have the ink repellency in respects to the ink, the ink which is jetted into the pixel units defined by the black matrix patterns flows through the light blocking part which is the black matrix pattern from the pixel unit to the adjacent pixel unit, which may cause color mixing in respects to the same color or the different colors.

Therefore, it is required that the black matrix pattern which is used as the partition during the inkjet printing has the significantly high ink repellency in respects to the ink. On the other hand, the jetted ink is uniformly spread in the pixel units only when the surface of the substrate of the pixel units defined by the black matrix pattern has the low ink repellency in respects to the ink, which prevents light leakage due to unfilling of the pixel units and reduces steps in the pixel unit or between the pixel units.

However, if the black matrix pattern is made of a black matrix material having the high ink repellency, the ink repellency substance of the black matrix material is adsorbed on the undesired pixel unit in the course of rapidly volatilizing the ink repellency substance during the post-baking process, which enables the surface of each of the pixel units to be reformed so that the surface of each of the pixel units has the ink repellency similar to that of the surface of the black matrix.

Accordingly, even though the ink is jetted, the ink is undesirably spread in each of the pixel units to cause the unfilling and significant steps in the pixel unit or between the pixel units.

The surface tension of the black matrix pattern depending on the type of surfactant which is added to provide the ink repellency to the black matrix pattern before the plasma treatment is described in Table 1, and the surface tension of the color ink which is jetted by using the inkjet process depending on the type of surfactant is described in Table 2. FIG. 1 and Table 3 show the jetting results of different types of color ink having the different surface tensions in respects to the substrate on which the black matrix patterns having the different surface tensions are formed without the plasma treatment.

In the case of the black matrices (BM1, BM4, and BM6), black matrix pattern surfaces of which have the high surface tension in the range of 36 to 45.4 mN/m, all the pixel units can be filled only by jetting 5 drops of ink 1 having the relatively high surface tension (26.4 mN/m) and ink 2 having the relatively low surface tension (24.3 mN/m). However, an overflow is observed between the adjacent pixel units. On the other hand, in the case of the black matrices (BM2 and BM5) having the middle surface tension in the range of 29 to 30 mN/m, the pixel units are filled but an overflow occurs when 20 drops of ink 1 and ink 2 are jetted. However, in the case of the black matrices (BM3 and BM7) having the surface tension of less than 25.3 mN/m, the filling is not obtained and an overflow occurs between the adjacent pixel units even though 20 drops of ink 1 and ink 2 are jetted.

As described above, when the color ink is jetted to the pixel unit of the black matrix substrate, it is required that the black matrix pattern has predetermined ink repellency in order to prevent an overflow of ink between the adjacent pixel units. In this connection with this, if the surface tension of the black matrix pattern is very low, the pixel unit has predetermined ink repellency. For this reason, the ink does not desirably flow to corners of a lower portion of the black matrix which canes into contact with the substrate to cause the unfilling. As a result, even though the amount of jetted ink (the number of ink drops) is increased, the unfilling and an overflow occur.

In order to avoid the above-mentioned problems, after the surface tension of the surface of the black matrix pattern is reduced to increase the ink repellency, the black matrix pattern may be subjected to the plasma treatment in an $O_2$ atmosphere to be partially hydrophilized, or the black matrix pattern having the relatively high surface tension may be subjected to the plasma treatment in a $CF_4$ atmosphere to be made partially hydrophobic. However, in this case, since the surface of the black matrix pattern and the pixel unit are totally made hydrophilic or hydrophobic during the plasma treatment, it is difficult to increase a difference in the spreadability or the ink repellency of ink between the surface of the black matrix pattern and the pixel unit.

Furthermore, in order to avoid the above-mentioned problems, Japanese Unexamined Patent Application Publication No. 1997-203803 discloses a method for performing surface treatment in respects to a main unit by using a ink affinity treatment agent and surface treatment in respects to a projection unit by using an ink repellency treatment agent. However, this method is problematic in that the treatment is performed by using the ink affinity treatment agent so that the ink repellency treatment agent is not affected or two treatment processes are separately performed by using the ink affinity treatment agent and the ink repellency treatment agent.

Furthermore, Korean Unexamined Patent Application Publication No. 2000-0047958 discloses a color filter which has a wettability-variable layer capable of changing the wettability. However, this method is disadvantageous in that the wettability-variable layer is separately provided in addition to a partition layer which is a light blocking part and an ink layer which is an opening part, thus complicating the production process. Additionally, Japanese Unexamined Patent Application Publication No. 2000-258622 discloses a method for pattern exposing a photosensitive layer to convert an exposed portion into a hydrophilic portion. However, in this method, it is required that an additional process is performed to form an additional photosensitive layer.

DISCLOSURE OF INVENTION

Technical Problem

It is an object of the present invention to provide a method for producing a color filter in which color mixing does not occur in a pixel unit or between pixel units during discharging of ink by using an inkjet printing process, discoloration due to unfilling does not occur, a surface is uniform, and there is an insignificant step in the pixel unit or between the pixel units by increasing a difference in ink repellency between a black matrix pattern and the pixel unit by using a plasma treatment process without additional processes during production of the color filter by using the inkjet printing process, and a color filter produced by using the method.

Technical Solution

The present invention provides a method for producing a color filter, which includes (a) forming a black matrix pattern having a surface tension of 26 to 45 mN/m on a substrate, (b) performing a plasma treatment of the substrate on which the black matrix pattern is formed, and (c) filling a pixel unit defined by the black matrix pattern by using ink.

Furthermore, the present invention provides a color filter produced by using the method for producing the color filter.

Additionally, the present invention provides a display device which includes the color filter.

Advantageous Effects

During production of a color filter by using an inkjet printing process, a difference in ink repellency between a black matrix pattern used as a partition and a pixel unit is increased to provide a color filter in which ink spreadality is improved in the pixel unit, color mixing does not occur in the pixel unit or between pixel units during discharging of ink by using an inkjet printing process, discoloration due to unfilling does not occur, a surface is uniform, and there is an insignificant step in the pixel unit or between the pixel units by increasing a difference in ink repellency between a black matrix pattern and the pixel unit.

BRIEF DESCRIPTION OF THE DRAWINGS

FIG. 1 illustrates CCD (Charge-Coupled Device) camera pictures (×50) of a color filter produced by using a black matrix which is not subjected to plasma treatment according to the present invention;

FIG. 2 illustrates CCD camera pictures (×50) of color filters according to Examples 1 to 5 of the present invention; and FIG. 3 illustrates CCD camera pictures (×50) of color filters according to Comparative Examples 1 to 5 of the present invention.

BEST MODE FOR CARRYING OUT THE INVENTION

Hereinafter, the present invention will be described in detail.

In the present invention, during the production of a color filter by using an inkjet printing process, a photosensitive resin composition for forming black matrices may be applied on a substrate, prebaked, exposed, developed, and postbaked to form a black matrix pattern which is used as a partition. The black matrix pattern thusly formed is subjected to hydrophobic surface treatment using plasma.

In this connection, it is preferable that the black matrix pattern have a surface tension of 26 to 45 mN/m according to the type and the content of the surfactant added to provide ink repellency, and a difference in ink repellency may be increased between the black matrix pattern and the pixel unit during the hydrophobic surface treatment by using a plasma.

If the surface tension of the black matrix pattern is less than 26 mN/m, a difference in ink repellency may be reduced between the black matrix pattern and the pixel unit after the hydrophobic surface treatment by using the plasma. In respects to the black matrix pattern having the surface tension of more than 45 mN/m, it is difficult to ensure the black matrix pattern having the surface tension of more than 45 mN/m even though the surfactant for reducing the surface tension of the black matrix pattern is not added. Additional surface treatment such as $O_2$ plasma treatment or hydrophilic coating may be performed in order to ensure the surface tension of more than 45 mN/m.

The present invention provides a method of producing a color filter, which includes (a) forming a black matrix pattern having a surface tension of 26 to 45 mN/m on a substrate, (b) performing a plasma treatment of the substrate on which the black matrix pattern is formed, and (c) filling a pixel unit defined by the black matrix pattern by using ink.

In step a, the black matrix pattern having the surface tension of 26 to 45 mN/m is formed on the substrate. The step a includes (a1) applying a photosensitive resin composition on the substrate, (a2) prebaking the photosensitive resin composition to form a black matrix film, and (a3) selectively exposing and developing the formed black matrix film and then performing postbaking.

Examples of the substrate include, but are not limited to a glass substrate, a plastic substrate, and a flexible substrate. It is preferable to use a transparent glass substrate having high heat resistance.

Examples of the photosensitive resin composition which is used to form the black matrix pattern on the substrate may include a coloring agent containing a black pigment, an alkali-soluble resin tinder, a multifunctional monomer having an ethylene unsaturated double bond, a photopolymerization initiator, a surfactant used to provide ink repellency, a solvent, and an additive.

The coloring agent containing the black pigment used in the present invention may be a mixture of carton black and two or more coloring pigments. Examples of the carbon black may include SEAST 5HIISAF-HS, SEAST KH, SEAST 3HHAF-HS, SEAST NH, SEAST 3M, SEAST 300HAF-LS, SEAST 116HMMAF-HS, SEAST 116MAF, SEAST FMFEF-HS, SEAST SOFEF, SEAST VGPF, SEAST SVH-SRF-HS, and SEAST SSRF which are manufactured by Tokai Carbon Co., Ltd.; DIAGRAM BLACK II, DIAGRAM BLACK N339, DIAGRAM BLACK SH, DIAGRAM BLACK H, DIAGRAM LH, DIAGRAM HA, DIAGRAM SF, DIAGRAM N550M, DIAGRAM M, DIAGRAM E, DIAGRAM G, DIAGRAM R, DIAGRAM N760M, DIAGRAM LR, #2700, #2600, #2400, #2350, #2300, #2200, #1000, #980, #900, MCF88, #52, #50, #47, #45, #45L, #25, #CF9, #95, #3030, #3050, MA7, MA77, MA8, MA11, OIL7B, OIL9B, OIL11B, OIL30B, and OIL31B which are manufactured by Mitsubishi Chemical Co. Ltd.; PRINITEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100, and LAMP BLACK-101 which are manufactured by Degussa Co., Ltd.; and RAVEN-1100ULTRA, RAVEN-1080ULTRA, RAVEN-1060ULTRA, RAVEN-1040, RAVEN-1035, RAVEN-1020, RAVEN-1000, RAVEN-890H, RAVEN-890, RAVEN-880ULTRA, RAVEN-860ULTRA, RAVEN-850, RAVEN-820, RAVEN-790ULTRA, RAVEN-780ULTRA, RAVEN-760ULTRA, RAVEN-520, RAVEN-500, RAVEN-460, RAVEN-450, RAVEN-430ULTRA, RAVEN-420, RAVEN-410, RAVEN-2500ULTRA, RAVEN-2000, RAVEN-1500, RAVEN-1255, RAVEN-1250, RAVEN-1200, RAVEN-1190ULTRA, and RAVEN-1170 which are manufactured by Colombia Carbon Co., Ltd.

Examples of the coloring agent which may be used along with the carton black may include CARMINE 6B (C.I. 12490), PHTHALOCYANINE GREEN (C.I. 74260), PHTHALOCYANINE BLUE (C.I. 74160), MITSUBISHI CARBON BLACK MA100, PERYLENE BLACK (BASF K0084. K0086), CYANINE BLACK, LIONOL YELLOW (C.I. 21090), LIONOL YELLOW GRO(C.I. 21090), BENZIDINE YELLOW 4T-564D, MITSUBISHI CARBON BLACK MA-40, VICTORIA PURE BLUE (C.I.42595), C.I. PIGMENT RED97, 122, 149, 168, 177, 180, 192, 215, C.I. PIGMENT GREEN 7, 36, C.I. PIGMENT 15:1, 15:4, 15:6, 22, 60, 64, C.I. PIGMENT 83, 139, C.I. PIGMENT VIOLET 23, white pigments, and fluorescent pigments. Furthermore, the above-mentioned coloring agents may be used alone or as a mixture of two or more species to obtain a black color.

It is preferable that the coloring agent be used in an amount of 20 to 50 parts by weight based on 100 parts by weight of total solid amount of the photosensitive resin composition. If the amount of the coloring agent is less than 20 parts by weight, since the OD per the thickness of a light-blocking pattern which is made of the photosensitive resin composition is reduced, it is required that the thickness of the pattern is significantly increased in order to obtain the desired OD. Accordingly, a step between color patterns formed by jetting the ink in respects to the pixel unit may be nude large.

Furthermore, if the amount of the coloring agent is more than 50 parts by weight, since the OD per the thickness is very high, there is an advantage in that the thickness of the pattern is reduced. However, since the amount of resin and crosslinking agent is relatively reduced, a process property to form the light-blocking pattern may be reduced. Additionally, various types of properties such as electric properties of the surface of the light-blocking pattern, adhesion strength to the substrate, and surface properties may be reduced.

The alkali-soluble resin binder which is used in the present invention may be prepared by copolymerizing a monomer having an acid function and another monomer capable of being copolymerized with the monomer having the acid function.

It is preferable that the monomer which contains the acid function be one or more selected from the group consisting of a (meta)acrylic acid, a crotonic acid, an itaconic acid, a maleic acid, a fumaric acid, a monomethyl maleic acid, an isoprene-sulfonic acid, and a styrene sulfonic acid.

It is preferable that the monomer which is capable of being copolymerized with the monomer which contains the acid function is one or more selected from the group consisting of styrene, chlorostyrene, α-methylstyrene, vinyl toluene, methyl (metha)acrylate, ethyl(metha)acrylate, butyl(metha)acrylate, benzyl(metha)acrylate, dimethylaminoethyl (metha)acrylate, isobutyl(metha)acrylate, t-butyl(metha)acrylate, cyclohexyl(metha)acrylate, isotonyl(metha)acrylate, 2-phenoxyethyl(metha)acrylate, tetrahydrofurfuryl (metha)acrylate, hydroxyethyl(metha)acrylate, 2-hydroxypropyl (metha)acrylate, 2-hydroxy-3-chloropropyl (metha)acrylate, 4-hydroxybutyl (metha)acrylate, acyloctyloxy-2-hydroxypropyl (metha)acrylate, ethylhexyl acrylate, 2-methoxyethyl(metha)acrylate, 3-methoxybutyl (metha)acrylate, ethoxydiethyleneglycol (metha)acrylate, methoxytriethyleneglycol (metha)acrylate, methoxytripropyleneglycol (metha)acrylate, methoxypolyethyleneglycol (metha)acrylate, phenoxydiethyleneglycol (metha)acrylate, p-nonylphenoxypolyethyleneglycol (metha)acrylate, p-nonylphenoxypolypropyleneglycol (metha)acrylate, tetrafluoropropyl(metha)acrylate, 1,1,1,3,3,3-hexafluoroisopropyl (metha)acrylate, octafluoropentyl(metha)acrylate, heptadecafluorodecyl(metha)acrylate, tribromophenyl (metha)acrylate, β-(metha)acyloxyethylhydrogen succinate, methyl α-hydroxymethyl acrylate, ethyl α-hydroxymethyl acrylate, propyl α-hydroxymethyl acrylate, and butyl α-hydroxymethyl acrylate.

Additionally, in the alkali-soluble resin tinder, the reaction group is a group which provides reactivity to the alkali-soluble resin tinder, and the reaction groups may be added to the copolymer of the alkali-soluble resin tinder or the multi-membered copolymer by using the polymer reaction. In connection with this, it is preferable that the reaction group be one or more selected from the group consisting of glycidyl (metha)acrylate, vinyl benzyl glycidyl ether, vinyl glycidyl ether, allyl glycidyl ether, 4-methyl-4,5-epoxypentene, γ-glycidoxy propyl trimethoxy silane, γ-glycidoxy propyl methyldiethoxy silane, γ-glycidoxy propyl triethoxy silane, and norbornyl derivatives.

It is preferable that the alkali-soluble resin tinder used in the present invention have the acid value in the range of about 50 to 300 KOH mg/g and the weight average molecular weight in the range of 1,000 to 200,000. The above-mentioned alkali-soluble resin finders may be used alone or as a mixture of two or more species.

It is preferable that the alkali-soluble resin tinder be used in an amount of 1 to 25 parts by weight (5 to 90% by weight based on the total solid amount of the photosensitive resin composition) based on 100 parts by weight of total solid amount of the photosensitive resin composition. If the amount of the alkali-soluble resin binder is less than 1 part by weight, the adhesion strength of the film which is formed by using the photosensitive resin composition is reduced. If the amount of the alkali-soluble resin tinder is more than 25 parts by weight, the strength and the sensitivity of the film which are formed by using the photosensitive resin composition may be reduced.

Examples of the multi-functional monomer having the ethylene unsaturated double bond may include a compound which has one or more unsaturated groups capable of being addition polymerized in the molecule and a boiling point of 100° C. or more, or a functional monomer having carprolactone.

Examples of the compound which has one or more unsaturated groups capable of being addition polymerized in the molecule and a boiling point of 100° C. or more may include a uni-functional monomer such as polyethylene glycol mono(metha)acrylate, polypropylene glycol mono(metha)acrylate, and phenoxyethyl(metha)acrylate, and a multi-functional monomer such as polyethylene glycol (metha)acrylate, polypropylene glycol(metha)acrylate, trimethylol ethane triacrylate, trimethylol propane triacrylate, neopentyl glycol (metha)acrylate, pentaerythritol tetraacrylate, pentaerythritol triacrylate, dipentaerythritol pentaacrylate, and dipentaerythritol hexaacrylate.

Furthermore, examples of the multi-functional monomer having carprolactone may include KAYARAD DPCA-20, 30, 60, and 120 which are added to dipentaerythritol, KAYARAD TC-110S which is added to tetrahydrofuryl acrylate, and KAYARAD HX-220 and KAYARAD HK-620 which are added to neopentylglycol hydroxy pivalate. Furthermore, examples of the usable multi-functional monomer may include epoxyacrylate of bisphenol A derivatives and novolac-epoxyacrylate, and examples of the urethane multi-functional acrylate may include U-324A, U15HA, and U-4HA. The above-mentioned multi-functional monomers having the ethylene unsaturated double bond may be used alone or as a mixture of two or more species.

It is preferable that the multi-functional monomer having the ethylene unsaturated double bond be used in an amount of 1 to 20 parts by weight (5 to 50% by weight based on the total solid amount of the photosensitive resin composition) based on 100 parts by weight of total solid amount of the photosensitive resin composition. If the amount of the multi-functional monomer having the ethylene unsaturated double bond is less than 1 part by weight, the photosensitivity or the strength of the coating film is reduced. If the amount of the multi-functional monomer is more than 20 parts by weight, since the adhesion strength of the photosensitive resin layer is excessively increased, the strength of the film may be poor and the pattern may be damaged during the development.

The photopolymerization initiator functions to generate radicals by using light, and may be preferably mixed with a compound which is one or more selected from the group consisting of an acetophenone compound, a non-imidazole compound, a triazine compound, and an oxime compound.

Examples of the acetophenone compound which is capable of being used as the photopolymerization initiator may include 2-hydroxy-2-methyl-1-phenylpropane-1-one, 1-(4-isopropylphenyl)-2-hydroxy-2-methylpropane-1-one, 4-(2-hydroxyethoxy)-phenyl-(2-hydroxy-2-propyl) ketone, 1-hydroxycyclohexyl phenyl ketone, benzoin methyl ether, benzoin ethyl ether, benzoin isobutyl ether, benzoin butyl ether, 2,2-dimethoxy-2-phenyl acetophenone, 2-methyl-(4-methylthio)phenyl-2-morpholino-1-propane-1-one, 2-benzyl-2-dimethylamino-1-(4-morpholinophenyl)-butane-1-one, and 2-methyl-1-[4-(methylthio)phenyl]-2-morpholinopropane-1-one. Examples of the non-imidazole compound may include 2,2'-bis(2-chlorophenyl)-4,4'5,5'-tetraphenyl non-imidazole, 2,2'-bis(o-chlorophenyl)-4,4'5,5'-tetrakis(3,4,5-trimethoxyphenyl)-1,2'-non-imidazole, 2,2'-bis(2,3-dichlorophenyl)-4,4'5,5'-tetraphenyl non-imidazole, and 2,2'-bis(o-chlorophenyl)-4,4,5,5'-tetraphenyl-1,2'-non-imidazole. Examples of the triazine compound may include 3-{4-[2,4-bis(trichloromethyl)-s-triane-6-yl]phenylthio}propionic acid, 1,1,1,3,3,3-hexafluoroisopropyl-3-{4-[2,4-bis(trichloromethyl)-s-triazine-6-yl]phenylthio}propionate, ethyl-2-{4-[2,4-bis(trichloromethyl)-s-triazine-6-yl]phenylthio}acetate, 2-epoxyethyl-2-{4-[2,4-bis(trichloromethyl)-s-triazine-6-yl]phenylthio}acetate, cyclohexyl-2-{4-[2,4-bis(trichloromethyp-s-triazine-6-yl]phenylthio}acetate, benzyl-2-{4-[2,4-bis(trichloranethyl)-s-triazine-6-yl]phenylthio}acetate, 3-{chloro-4-[2,4-bis(trichloromethyl)-s-triazine-6-yl]phenylthio}propionic acid, 3-{4-[2,4-bis(trichloromethyl)-s-triazine-6-yl]phenylthio}propion amide, 2,4-bis(trichloromethyl)-6-p-methoxystyryl-s-triazine, 2,4-bis(trichloromethyl)-6-(1-p-dimethylaminophenyl)-1,3,-butadienyl-s-triazine, and 2-trichloromethyl-4-amino-6-p-methoxystyryl-s-triazine. Examples of the oxime compound may include CGI-242 and CGI-124 which are manufactured by Chiba Co., Ltd. in Japan.

It is preferable that the photopolymerization initiator be used in an amount of 1 to 300 parts by weight based on 100 parts by weight of the multi-functional monomer having the ethylene unsaturated double bond of the photosensitive resin composition. In particular, it is preferable that 0.1 to 5 parts by weight of the acetophenone compound, 0.1 to 5 parts by weight of the non-imidazole compound, or 0.05 to 5 parts by weight of the triazine compound be used based on 100 parts by weight of the total solid content of the photosensitive resin composition.

The photopolymerization initiator may further include 0.01 to 5 parts by weight of a photocrosslinking sensitizer which promotes generation of radicals, or 0.01 to 5 parts by weight of a curing accelerator which promotes curing as an auxiliary component based on 100 parts by weight of the total solid amount of the photosensitive resin composition.

Examples of the photocrosslinking sensitizer may include a benzophenone compound such as benzophenone, 4,4-bis(dimethylamino)benzophenone, 4,4-bis(diethylamino)benzophenone, 2,4,6-trimethylaminobenzophenone, methyl-o-benzoyl benzoate, 3,3-dimethyl-4-methoxybenzophenone, and 3,3,4,4-tetra(t-butylperoxycarbonyl)benzophenone; a fluorenone compound such as 9-fluorenone, 2-chloro-9-fluorenone, and 2-methyl-9-fluorenone; a thioxanthone compound such as thioxanthone, 2,4-diethylthioxanthone, 2-chlorothioxanthone, 1-chloro-4-propyloxythioxanthone, isopropylthioxanthone, and diisopropylthioxanthone; a xanthone compound such as xanthone and 2-methylxanthone; an anthraquinone compound such as anthraquinone, 2-methylanthraquinone, 2-ethylanthraquinone, t-butylanthraquinone, and 2,6-dichloro-9,10-anthraquinone; an acridine compound such as 9-phenylacridine, 1,7-bis(9-acridinyl)heptane, 1,5-bis(9-acridinylpentane), and 1,3-bis(9-acridinyl)propane; a dicarbonyl compound such as benzyl, 1,7,7-trimethyl-bicyclo-[2,2,1]heptane-2,3-dione, and 9,10-phenanthrenequinone; a phosphine oxide compound such as 2,4,6-trimethylbenzoyldiphenylphosphine oxide and bis(2,6-dimethoxybenzoyl)-2,4,4-trimethylpentylphosphine oxide; a benzophenone compound such as methyl-4-(dimethylamino) benzoate, ethyl-4-(dimethylamino) benzoate, and 2-n-butoxyethyl-4-(dimethylamino)benzoate; an amino synergist such as 2,5-bis(4-diethylaminobenzal)cyclopentanone, 2,6-bis(4-diethylaminobenzal)cyclohexanone, and 2,6-bis(4-diethylaminobenzal)-4-methyl-cyclopentanone; a coumarin compound such as 3,3-carbonylvinyl-7-(diethylamino)coumarin, 3-(2-benzothiazolyl)-7-(diethylamino)coumarin, 3-benzoyl-7-(diethylamino)coumarin, 3-benzoyl-7-methoxy-coumarin, and 10,10-carbonylbis[1,1,7,7-tetramethyl-2,3,6,7-tetrahydro-1H,5H,11H-C1]-benzopyrano[6,7,8-ij]-qinolizine-11-one; a chalcone compound such as 4-diethylaminochalcone and 4-azidebenzalacetophenone; 2-benzoylmethylene; and 3-methyl-b-naphthothiazoline.

Furthermore, examples of the curing accelerator may include 2-mercaptobenzoimidazole, 2-mercaptobenzothiazole, 2-mercaptobenzoxazole, 2,5-dimercapto-1,3,4-thiadiazole, 2-mercapto-4,6-dimethylaminopyridine, pentaerithritol-tetrakis(3-mercaptopropionate), pentaerithritol-tris(3-mercaptopropionate), pentaerithritol-tetrakis(2-mercaptoacetate), pentaerithritol-tris(2-mercaptoacetate), trimethylolpropane-tris(2-mercaptoacetate), and trimethylolpropane-tris(3-mercaptopropionate).

The surfactant functions to provide ink repellency to the black matrix pattern. Examples of the surfactant may include a silicon surfactant and a fluorine surfactant. Specific examples of the silicon surfactant may include, but are not limited to BYK-077, BYK-085, BYK-300, BYK-301, BYK-302, BYK-306, BYK-307, BYK-310, BYK-320, BYK-322, BYK-323, BYK-325, BYK-330, BYK-331, BYK-333, BYK-335, BYK-341v344, BYK-345v346, BYK-348 BYK-354, BYK-355, BYK-356, BYK-358, BYK-361, BYK-370, BYK-371, BYK-375, BYK-380, and BYK-390, which are manufactured by BYK-Chemie Co., Ltd. Specific examples of the fluorine surfactant may include, hit are not limited to F-114, F-177, F-410, F-411, F-450, F-493, F-494, F-443, F-444, F-445, F-446, F-470, F-471, F-472SF, F-474, F-475, F-477, F-478, F-479, F-480SF, F-482, F-483, F-484, F-486, F-487, F-172D, MCF-350SF, TF-1025SF, TF-1117SF, TF-1026SF, TF-1128, TF-1127, TF-1129, TF-1126, TF-1130, TF-1116SF, TF-1131, TF1132, TF1027SF, TF-1441, and TF-1442, which are manufactured by DIC (DaiNippon Ink & Chemicals) Co., Ltd.

It is preferable that the surfactant which is added to provide the ink repellency be used in an amount of 0.03 to 1.2 parts by weight based on 100 parts by weight of the total solid amount of the photosensitive resin composition.

In consideration of the solubility, the pigment dispersibility, and the coating property, examples of the solvent may include propylene glycol monomethyl ether, ethylene glycol monomethyl ether acetate, propylene glycol monomethyl ether acetate, propylene glycol monoethyl ether acetate, diethylene glycol dimethyl ether, cyclohexanone, 2-heptanone, 3-heptanone, 2-hydroxyethyl propionate, 3-methyl-3-methoxybutyl propionate, ethyl-3-methoxy propionate, methyl-3-ethoxy propionate, ethyl-3-ethoxy propionate, butyl acetate, amylpermate, isoamyl acetate, isobutyl acetate, butyl propionate, isopropyl butyrate, ethyl butyrate, butyl butyrate, ethyl pyruvate, and γ-butyrol acetate. The above-mentioned solvents may be used alone or as a mixture of two or more species.

The photosensitive resin composition may further include one or more additives selected from the group consisting of a dispersing agent, an adhesion promoter, an antioxidant, an ultraviolet-absorbing agent, and a heat-polymerization inhibitor.

The dispersing agent may be internally added to the pigment by performing surface treatment of the pigment in advance, or externally added to the pigment. The dispersing agent may be classified into a polymer type dispersing agent, a non-ionic dispersing agent, an anionic dispersing agent, and a cationic dispersing agent. Examples of the dispersing agent may include polyalkylene glycol and ester thereof, polyoxyalkylene polyhydric alcohol, ester alkylene oxide additives, alcohol alkylene oxide additives, sulfuric acid ester, sulfonic acid salts, carboxylic acid ester, carboxylates, alkylamidalkylene oxide additives, and alkylamine. They may be added alone or as a mixture of two or more species.

Examples of the adhesion promoter may include vinyltrimethoxysilane, vinyltriethoxysilane, vinyltris(2-methoxyethoxy)-silane, N-(2-aminoethyl)-3-aminopropylmethyldimethoxysilane, N-(2-aminoethyl)-3-aminopropylmethyltrimethoxysilane, 3-aminopropyltriethoxysilane, 3-glycidoxypropyltriethoxysilane, 3-glycidoxypropylmethyldimethoxysilane, 2-(3,4-ethoxy cyclohexyl)ethyltrimethoxysilane, 3-chloropropylmethyldimethoxysilane, 3-chloropropyltrimethoxysilane, 3-methacryloxypropyltrimethoxysilane, and 3-mercaptopropyltrimethoxysilane.

Examples of the antioxidant may include 2,2-thiobis(4-methyl-6-t-butylphenol) and 2,6-g,t-butylphenol, and examples of the ultraviolet-absorbing agent may include 2-(3-t-butyl-5-methyl-2-hydroxyphenyl)-5-chloro-benzotriazole and alkoxy benzophenone.

In addition, examples of the heat-polymerization inhibitor may include hydroquinone, p-methoxyphenol, di-t-butyl-p-cresol, pyrogalol, t-butyl catechol, benzoquinone, 4,4-thiobis (3-methyl-6-t-butylphenol), 2,2-methylenebis(4-methyl-6-t-butylphenol), and 2-mercaptoimidazole.

In addition, the photosensitive resin composition may further include one or more additives selected from the group consisting of a carton black dispersion substance, a resin binder having a predetermined function, a monomer, a radiation sensitive compound, and other additives.

During step a1, the application of the photosensitive resin composition on the substrate may be performed by using a process which is known in the related art, for example, spin coating, dip coating, doctor blading or the like.

During step a2, it is preferable that the prebaking be performed at 80 to 120° C. for 1 to 5 min.

The selective exposure and development may be performed during step a3 by using a process which is known in the related art. The black matrix film is exposed to a light source of g-ray (436 nm), h-ray (405 nm), or i-ray (365 nm), or a combined light source thereof, which passes through the pattern mask, by using an exposing device such as a maskaligner, a stepper, or a scanner. Exposing energy depends on the sensitivity of the black matrix film, and may be in the range of 20 to 200 mJ/cm$^2$. After the exposure is finished, the substrate may be dipped in the developing solution or the developing solution may be sprayed on the substrate to form the desired black matrix pattern. In addition, after the development is finished, the black matrix pattern may be post-baked to increase the adhesion strength to the lower substrate. In respects to the post-baking condition, it is preferable that the post-baking be performed at 200 to 250° C. for 10 to 200 min.

Preferably, the formed black matrix pattern has an optical density (OD) in the range of about 3 to 6 when the pattern has a thickness in the range of 1.1 to 5 μm, and the surface of the black matrix pattern has the surface tension in the range of 26 to 45 mN/m according to the type and the amount of the added surfactant.

During step b, the substrate on which the black matrix pattern is formed is subjected to the plasma treatment.

The substrate on which the black matrix pattern is formed is subjected to the plasma treatment in a CF$_4$ gas atmosphere to perform the hydrophobic surface treatment. In general, voltage is increased in respects to two electrodes having different electric potential differences in a vacuum to generate a plasma. In connection with this, the plasma may be applied to fields such as surface cleaning, surface reforming, surface etching, or surface deposition according to the type of gas which is used to form the plasma. In the present invention, the black matrix substrate is subjected to the hydrophobic treatment by using CF$_4$ as active gas according to a plasma surface etching process and a surface deposition process of a hydrophobic layer. In connection with this, there is a difference in degree of the hydrophobic surface treatment by using the plasma between the surface of the black matrix pattern made of an organic substance and the surface of glass of the pixel unit made of an inorganic substance. Accordingly, the substrate which the black matrix pattern having the surface tension in the range of 26 to 45 mN/m is formed may be subjected to the hydrophobic surface treatment by using the plasma to increase a difference in ink repellency between the surface of the black matrix pattern and the pixel unit.

During step c, the pixel unit which is defined by the black matrix pattern is filled with ink.

R, G, and B types of ink which is applied on the substrate having significantly different ink repellencies between the black matrix pattern and the pixel unit formed according to the hydrophobic surface treatment by using the plasma according to an inkjet process may be a photo-curable or heat-curable ink. If the ink is the photo-curable ink, the ink may contain a coloring agent having a pigment used to provide a color characteristic, a resin tinder, a multi-functional monomer having an ethylene unsaturated double bond, a photopolymerization initiator, a surfactant used to provide ink repellency, a solvent, and other additives. If the ink is the heat-curable ink, the ink may contain a coloring agent having a pigment used to provide a color characteristic, a resin tinder, a mild-functional monomer having an ethylene unsaturated double bond, a heatpolymerization initiator or catalyst, a surfactant used to provide ink repellency, a solvent, and other additives. If the photo-curable or heat-curable ink is color ink for inkjet, since a developing process is not performed by using alkali unlike the case of a photoresist used in a typical photolithography process, the ink may not have an acid value.

Examples of the red pigment which is used to provide color characteristics for production of color ink may include a naphthol red pigment such as Pig.Red #1 (C.I.12070), Pig.Red #2 (C.I.12310), Pig.Red #3 (C.I.12120), Pig.Red #4 (C.I.12085), Pig.Red #5 (C.I.12490), Pig.Red #6 (C.I.12090), Pig.Red #7 (C.I.12420), Pig.Red #8 (C.I.12355), Pig.Red #9 (C.I.12460), Pig.Red #10 (C.I.12440), Pig.Red #11 (C.I.12430), Pig.Red #12 (C.I.12385), Pig.Red #13 (C.I.12395), Pig.Red #14 (C.I.12380), Pig.Red #15 (C.I.12465), Pig.Red #16 (12500), Pig.Red #17 (C.I.12390), Pig.Red #18 (C.I.12350), Pig.Red #21 (C.I.12300), Pig.Red #22 (C.I.12315), Pig.Red #23 (C.I.12355), Pig.Red #31 (12360), Pig.Red #32 (12320), Pig.Red #95 (C.I.15897), Pig.Red #112 (C.I.12370), Pig.Red #114 (C.I.12351), Pig.Red #119 (C.I.12469), Pig.Red #146 (C.I.12485), Pig.Red #147 (C.I.12433), Pig.Red #148 (C.I.12369), Pig.Red #150 (C.I.12290), Pig.Red #151 (C.I.15890), Pig.Red #184 (C.I.12487), Pig.Red #187 (C.I.12486), Pig.Red #188 (C.I.12467), Pig.Red #210 (C.I.12474), Pig.Red #245 (C.I.12317), Pig.Red #253 (C.I.12375), Pig.Red #253 (C.I.12318), and Pig.Red #261 (C.I.12468); a complex of naphthol and metal such as Pig.Red #49 (C.I.15630), Pig.Red #49:1 (C.I.15630:1), Pig.Red #49:2 (C.I.15630:2), Pig.Red #49:3 (C.I.15630:3), Pig.Red #50:1 (C.I.15500:1), Pig.Red #51:1 (C.I.15530:1), Pig.Red #53 (C.I.15985), Pig.Red #53:1 (C.I.15535:1), Pig.Red #68 (C.I.15525), Pig.Red #243 (C.I.15910), and Pig.Red #247 (C.I.15915); disazopyrazolones such as Pig.Red #37 (C.I.21205), Pig.Red #38 (C.I.21210), and Pig.Red #41 (C.I.21200); a disazo condensate such as Pig.Red #144 (C.I.20735), Pig.Red #166 (C.I.20035), Pig.Red #220 (C.I.20055), Pig.Red #221 (C.I.20065), and Pig.Red #242 (C.I.20067); a 2-hydroxy-3-naphthoic acid metal complex such as Pig.Red #48:1 (C.I.15865:1), Pig.Red #48:2 (C.I.15865:2), Pig.Red #48:3 (C.I.15865:3), Pig.Red #48:4 (C.I.15865:4), Pig.Red #48:5 (C.I.15865:5), Pig.Red #52:1 (C.I.15860:1), Pig.Red #52:2 (C.I.15860:2), Pig.Red #57:1 (C.I.15850:1), Pig.Red #58:2 (C.I.15825:2), Pig.Red #58:4 (C.I.15825:4), Pig.Red #63:1 (C.I.15880:1), Pig.Red #63:2 (C.I.15880:2), Pig.Red #64 (C.I.15800), Pig.Red #64:1 (C.I.15800:1), and Pig.Red #200 (C.I.15867); a naphthalene-sulphonic acid metal complex such as Pig.Red #60:1 (C.I.16105:1), Pig.Red #66 (C.I.18000:1), and Pig.Red #67 (C.I.18025:1); triaryl carboniums such as Pig.Red #81:1 (C.I.45160:1), Pig.Red #81:3 (C.I.45160:3), and Pig.Red #169 (C.I.45160:2); anthraquinones such as Pig.Red #89 (C.I.60745) and Pig.Red #177 (65300); thioindigos such as Pig.Red #88 (C.I.73312) and Pig.Red #181 (C.I.73360); quinacridones such as Pig.Red #122 (C.I.73915), Pig.Red #207 (C.I.73900), and Pig.Red #209 (C.I.73905); perylenes such as Pig.Red #123 (C.I.71145), Pig.Red #149 (C.I.71137), Pig.Red #178 (C.I.71155), Pig.Red #179 (C.I.71130), Pig.Red #190 (C.I.71140), Pig.Red #194 (C.I.71100), and Pig.Red #224 (C.I.71127); benzimidazolones such as Pig.Red #171 (C.I.12512), Pig.Red #175 (C.I.12513), Pig.Red #176 (C.I.12515), Pig.Red #185 (C.I.12516), and Pig.Red #208 (C.I.12514); pyranthrones such as Pig.Red #216 (C.I.59710); diketopyrrolopyrrols such as Pig.Red #254 (C.I.56110); and isoindolines such as Pig.Red #260 (C.I.56295).

Examples of the violet pigment may include triaryl carboniums such as Pig.Violet#1 (C.I.45170:2), Pig.Violet#2 (C.I.45175:1), Pig.Violet#3 (C.I.42535:2), Pig.Violet#27 (C.I.42535:3), and Pig.Violet#39 (C.I.42555:2); anthraquinones such as Pig.Violet#5:1 (C.I.58055:1); naphthols such as Pig.Violet#25 (C.I.12321) and Pig.Violet#50 (C.I.12322); quinacridones such as Pig.Violet#19 (C.I.73900); dioxazines such as Pig.Violet#23 (C.I.51319) and Pig.Violet#37 (C.I.51345); perylenes such as Pig.Violet#29 (C.I.71129); and benzimidazolones such as Pig.Violet#32 (C.I.12517).

Examples of the blue pigment may include triaryl carboniums such as Pig.Blue#1 (C.I.42595:2), Pig.Blue#2 (C.I.44045:2), Pig.Blue#9 (C.I.42025:1), Pig.Blue#10 (C.I.44040:2), Pig.Blue#14 (C.I.42600:1), Pig.Blue#18 (C.I.42770:1), Pig.Blue#19 (C.I.42750), Pig.Blue#56 (C.I.42800), and Pig.Blue#62 (C.I.44084); Cu phthalocyanines such as Pig.Blue#15 (C.I.74160) and Pig.Blue#15:1 (C.I.74160); metal free phthalocyanines such as Pig.Blue#16 (C.I.74100); indanthrones such as Pig.Blue#60(C.I.69800) and Pig.Blue#64 (C.I.69825); and indigos such as Pig. Blue#66 (C.I.73000) and Pig.Blue#63 (C.I.73015:x).

Examples of the green pigment may include triaryl carboniums such as Pig.Green#1 (C.I.42040:1), Pig.Green#2 (C.I.42040:1), and Pig.Green#4 (C.I.42000:2); Cu phthalocyanines such as Pig.Green#7 (C.I.74260) and Pig.Green#36 (C.I.74265); and a metal complex such as Pig.Green#8 (C.I.10006) and Pig.Green#10 (C.I.12775).

Examples of the yellow pigment may include monoazos such as Pig.Yellow#1 (C.I.11680), Pig.Yellow#2 (C.I.11730), Pig.Yellow#3 (C.I.11710), Pig.Yellow#5 (C.I.11660), Pig.Yellow#6 (C.I.11670), Pig.Yellow#10 (C.I.12710), Pig.Yellow#49 (C.I.11765), Pig.Yellow#65 (C.I.11740), Pig.Yellow#73 (C.I.11738), Pig.Yellow#74 (C.I.11741), Pig.Yellow#75 (C.I.11770), Pig.Yellow#97 (C.I.11767), Pig.Yellow#98 (C.I.11727), Pig.Yellow#111 (C.I.11745), Pig.Yellow#116 (C.I.11790), and Pig.Yellow#167 (C.I.11737); a monoazo-metal complex such as Pig.Yellow#61 (C.I.13880), Pig.Yellow#62:1 (C.I.13940:1), Pig.Yellow#100 (C.I.19140:1), Pig.Yellow#168 (C.I.13960), Pig.Yellow#169 (C.I.13955), and Pig.Yellow#183 (C.I.18792); bisacetoacetarylrides such as Pig.Yellow#16 (C.I.20040); diarylrides such as Pig.Yellow#12 (C.I.21090), Pig.Yellow#13 (C.I.21100), Pig.Yellow#14 (C.I.21095), Pig.Yellow#17 (C.I.21105), Pig.Yellow#55 (C.I.21096), Pig.Yellow#63 (C.I.21091), Pig.Yellow#81 (C.I.21127), Pig.Yellow#83 (C.I.21108), Pig.Yellow#87 (C.I.21107:1), Pig.Yellow#113 (C.I.21126), Pig.Yellow#114 (C.I.21092), Pig.Yellow#124 (C.I.21107), Pig.Yellow#126 (C.I.21101), Pig.Yellow#127 (21102), Pig.Yellow#152 (C.I.21111), Pig.Yellow#170 (C.I.21104), Pig.Yellow#171 (C.I.21106), Pig.Yellow#172 (C.I.21109), and Pig.Yellow#174 (C.I.21098); flavanthrones such as Pig.Yellow#24 (C.I.70600); a diazo condensate such as Pig.Yellow#93 (C.I.20710), Pig.Yellow#94 (C.I.20038), Pig.Yellow#95 (C.I.20034), Pig.Yellow#128 (C.I.20037), and Pig.Yellow#166 (C.I.20035); anthraquinones such as Pig.Yellow#123 (C.I.65049) and Pig.Yellow#147 (C.I.60645); aldazines such as Pig.Yellow#101 (C.I.48052); a naphthalene sulfonic acid-metal complex such as Pig.Yellow#104 (C.I.15985:1); anthrapyrimidines such as Pig.Yellow#108 (C.I.68420); isoindolinones such as Pig.Yellow#109 (C.I.56284), Pig.Yellow#110 (C.I.56280), Pig.Yellow#139 (C.I.56298), and Pig.Yellow#185 (C.I.56290); benzinidazolones such as Pig.Yellow#123 (C.I.11783), Pig.Yellow#154 (C.I.13980), Pig.Yellow#175 (C.I.11784), Pig.Yellow#180 (C.I.21290), and Pig.Yellow#181 (C.I.11777); quinophthalones such as Pig.Yellow#138 (C.I.56300); a metal complex such as Pig.Yellow#117 (C.I.48043), Pig.Yellow#129 (C.I.48042), Pig.Yellow#150(C.I.12764), Pig.Yellow#153 (C.I.48545), Pig.Yellow#177 (C.I.48120), and Pig.Yellow#179 (C.I.48125).

In addition, examples of the orange pigment may include monoazos such as Pig.Orange#1 (C.I.11725) and Pig.Orange#6 (C.I.12730); naphthols such as Pig.Orange#2 (C.I.12060), Pig.Orange#5 (C.I.12075), Pig.Orange#22 (C.I.12470), Pig.Orange#24 (C.I.12305), and Pig.Orange#38 (C.I.12367); a naphthol-metal complex such as Pig.Orange#17 (C.I.15510:1 Pig.Orange#17:1 (15510:2), and Pig.Orange#46 (C.I.15602); disazopyrazolones such as Pig.Orange#13 (C.I.21110) and Pig.Orange#34 (C.I.21115); diarylrides such as Pig.Orange#15 (C.I.21130) and Pig.Orange#16 (C.I.21160); a naphthalene sulfonic acid-metal complex such as Pig.Orange#19 (C.I.15990); a disazo condensate such as Pig.Orange#31 (C.I.20050); benzimidazolones such as Pig.Orange#36 (C.I.11780) and Pig.Orange#60 (C.I.11782); pyranthrones such as Pig.Orange#40 (C.I.59700); perinones such as Pig.Orange#43 (C.I.71105); quinacridones such as Pig.Orange#48 (C.I.73900); and isoindolines such as Pig.Orange#61 (C.I.11265), Pig.Orange#66 (C.I.48210), and Pig.Orange#69 (C.I.56292).

Examples of the heat-curable initiator which is applied to the heat-curable ink may include, but are not limited to azo compounds such as azo nitriles manufactured by Wako Pure chemical Industris., Ltd. such as V-60, V-65, V-59, V-70, and V-40, azo esters such as V-601, azo amides such as VA-086, VA-085, VA-080, Vam-110, Vam-111, and VF-096, azo amidines such as V-50, VA-044, VA-046B, Aam-027, VA-060, VA-057, and VA-061, and macroazo initiators such as VPS-0501, VPS-1001, VPE-0201, VPE-0401, VPE-0601, and VPTG-0301.

It is preferable that the color ink for inkjet have the surface tension in the range of 20 to 30 mN/m in order to prevent an overflow in the black matrix pattern and ensure desirable filling of the pixel unit. Preferably, the photo-curable or heat-curable ink contains a silicon or fluorine surfactant in an amount of 0.01 to 0.1 parts by weight based on 100 parts by weight of the ink composition so that the color ink has the surface tension in the range of 20 to 30 mN/m, and has a contact angle in the range of 20 to 60 in respects to the surface of the black matrix pattern.

Among them, examples of the silicon surfactant which is very useful to reduce the surface tension may include, but are not limited to BYK-300, BYK-301, BYK-302, BYK-306, BYK-307, BYK-310, BYK-330, BYK-333, BYK-335, BYK-341, BYK-344, BYK-345, and BYK-370. Examples of the fluorine surfactant may include, but are not limited to F-114, F-177, F-410, F-411, F-450, F-493, F-494, F-443, F-444, F-445, F-446, F-470, F-471, F-475, F-482, F-487, F-172D, TF-1128, TF-1127, TF-1129, TF-1126, TF-1130, TF-1116SF, TF-1131, TF1132, TF1027SF, TF-1441, and TF-1442.

It is preferable that the filling of the photo-curable or heat-curable ink be performed by using the inkjet method, and R, G, and B types of ink may be simultaneously or continuously used to perform the filling.

In respects to the photo-curable type ink, after different types of ink are separately discharged or simultaneously discharged, the low temperature heat curing is performed at a temperature in the range of 50 to 150° C. for 10 to 2000 sec, the exposing is performed in an exposure dose in the range of 40 to 300 mJ/cm$^2$, and the high temperature heat curing is performed at a temperature in the range of 200 to 250° C. for 10 to 200 min. As to the heat-curable type ink, after different types of ink are separately discharged or simultaneously discharged, the low temperature heat curing is performed at a temperature in the range of 50 to 150° C. for 10 to 2000 sec, and the high temperature heat curing is performed at a temperature in the range of 200 to 250° C. for 10 to 200 min without a separate exposing process. The above-mentioned procedure may be performed in respects to the ink mixture of the photo-curable type ink and the heat-curable type ink.

In addition, the present invention provides a color filter which is produced by using the above-mentioned method.

Furthermore, the present invention provides a display device which includes the color filter.

The display device according to the present invention may have a configuration which is known in the related art, except that the display device includes the color filter according to the present invention.

MODE FOR THE INVENTION

A better understanding of the present invention may be obtained in light of the following Examples which are set forth to illustrate, but are not to be construed to limit the present invention.

PREPARATION EXAMPLE 1

Preparation of the Light Blocking Photosensitive Resin Composition

Based on 1000 parts by weight of the light blocking photosensitive resin composition, 65 parts by weight of carbon black used as the coloring agent, 29 parts by weight of the copolymer of benzyl(metha)acrylate/(metha)acrylic acid (acid value 110 KOH mg/g, molar ratio 70/30, Mw=30,000) used as the alkali-soluble resin tinder, 70 parts by weight of the polymer in which allylglycidyl ether was added to the copolymer of benzyl(metha)acrylate/(metha)acrylic acid (acid value 80 KOH mg/g, Mw=22,000), 50 parts by weight of dipentaerythritolhexaacrylate used as the functional monomer, 20 parts by weight of 2-benzyl-2-(dimethylamino)-1-(4-morpholinophenyl)butyl-1-one used as the photopolymerization initiator, 10 parts by weight of 2,2'-bis(o-chlorophenyl)-4,4,5,5'-tetraphenyl-1,2'-non-imidazole, 5 parts by weight of 4,4-bis(diethylamino)benzophenone, 5 parts by weight of mercaptobenzothiazole, 9 parts by weight of the polyester dispersing agent used as the additive, 0.53 parts by weight of 3-methacryloxypropyltrimethoxysilane used as the adhesion promoter, 1 part by weight of the silicon or fluorine surfactant used as the leveling agent for providing the ink repellency, 440 parts by weight of propylene glycol monomethyl ether acetate used as the solvent, and 290 parts by weight of ethoxyethyl propionate were mixed with each other. Next, the mixture was agitated for 5 hours to prepare the black matrix photosensitive resin composition.

PREPARATION EXAMPLE 2

Preparation of the Color Ink for Inkjet

Inkjet R Ink #1

As to the red ink which was sprayed onto the pixel units by using the inkjet process, based on 1000 parts by weight of the inkjet composition, 56.4 parts by weight of PIGMENT RED #254, 16.3 parts by weight of PIGMENT RED #177, and 11.3 parts by weight of PIGMENT YELLOW #139, which were used as the coloring agent, 50.8 parts by weight of the polymer (Mw=24,000) used as the alkali-soluble resin binder, in which allyl glycidyl ether was added to the copolymer containing benzyl(metha)acrylate and (meta)acrylic acid mixed with each other at the molar ratio of 70:30, 101.5 parts by weight of dipentaerythritolhexaacrylate used as the functional monomer, 5 parts by weight of the azoamide heat-curing initiator (yam-110, Wako Pure Chemical Industris., Ltd.), 39 parts by weight of the polyester dispersing agent used as the additive, 10 parts by weight of 3-methacryloxypropyltrimethoxysilane, 0.35 parts by weight of the fluorine surfactant (Megaface F-475, Japan Ink Chemical Industry Co, Ltd., Japan) used as the leveling agent, 530 parts by weight of butyl carbitol acetate used as the solvent, 35 parts by weight of propylene glycol monomethyl ether acetate, 60 parts by weight of methoxy propanol, and 20 parts by weight of butyl cellosolve acetate were mixed with each other, and the mixture was then agitated for 5 hours to prepare the ink composition for inkjet.

Inkjet R Ink #2

As to the red ink which was sprayed onto the pixel units by using the inkjet process, based on 1000 parts by weight of the inkjet composition, 56.4 parts by weight of PIGMENT RED #254, 16.3 parts by weight of PIGMENT RED #177, and 11.3 parts by weight of PIGMENT YELLOW #139, which were used as the coloring agent, 39.3 parts by weight of the polymer (Mw=24,000) used as the alkali-soluble resin Under, in which allyl glycidyl ether was added to the copolymer containing benzyl(metha)acrylate and (meta)acrylic acid mixed with each other at the molar ratio of 70:30, 78.6 parts by weight of dipentaerythritolhexaacrylate used as the functional monomer, 5 parts by weight of the azoamide heat-curing initiator (Vam-110, Wako Pure Chemical Industris., Ltd.), 37 parts by weight of the polyester dispersing agent used as the additive, 10 parts by weight of 3-methacryloxypropyltrimethoxysilane, 0.6 parts by weight of the silicon surfactant (BYK330, BYK Chemie, Germany) used as the leveling agent, 620 parts by weight of butyl carbitol acetate used as the solvent, 37 parts by weight of propylene glycol monomethyl ether acetate, 60 parts by weight of methoxy propanol, and 20 parts by weight of butyl cellosolve acetate were mixed with each other, and the mixture was then agitated for 5 hours to prepare the ink composition for inkjet.

Inkjet R Ink #3

R ink #3 was prepared by using the same procedure as R ink #1, except that 0.35 parts by weight of Megaface F-487 (Japan Ink Chemical Industry Co., Ltd., Japan) was added instead of F-475 as the fluorine surfactant unlike the case of inkjet R ink #1.

Inkjet R Ink #4

R ink #4 was prepared by using the same procedure as R ink #2, except that 0.6 parts by weight of BYK331 (BYK Chemie, Germany) was added instead of BYK330 as the silicon surfactant unlike the case of inkjet R ink #2.

EXAMPLE 1

The photosensitive resin composition solution (BM5) which was prepared by using the surfactant of F-177 described in the following Table 1 was applied on glass by using spin coating, and subjected to preheat treatment at about 100° C. for 2 min to form a film having a thickness of about 2.4 µm. Next, the film was cooled at room temperature, and exposed using energy of 100 mJ/cm$^2$ by means of a photomask and a high-pressure mercury lamp. The exposed substrate was developed by using the 0.04% KOH aqueous solution at a temperature of 25° C. according to the spray process, washed with pure water, dried by using air blowing, post-baked in a convection oven at 220° C. for 30 min, and subjected to the hydrophobic surface treatment by using the plasma in a $CF_4$ gas atmosphere.

Subsequently, the prepared inkjet R ink #1 was discharged to the pixel unit. In connection with this, the size of the pixel unit was 212.5 µm×572.5 µm. After the discharging of ink, the low temperature heat curing was performed at 100° C. for 2 min, and the post-baking was performed at 220° C. for 30 min in order to perform the curing of ink. The jetting results of ink are described in Table 4.

EXAMPLE 2

The color filter was produced by using the same procedure as Example 1, except that BYK307 (BM2) was used as the surfactant and inkjet R ink #2 was used as the ink during the production of the photosensitive resin composition. The jetting results of the ink are described in Table 4.

EXAMPLE 3

The color filter was produced by using the same procedure as Example 1, except that BYK331 (BM4) was used as the surfactant and inkjet R ink #2 was used as the ink during the production of the photosensitive resin composition. The jetting results of the ink are described in Table 4.

EXAMPLE 4

The color filter was produced by using the same procedure as Example 1, except that F-177 (BM5) was used as the surfactant and inkjet R ink #2 was used as the ink during the production of the photosensitive resin composition. The jetting results of the ink are described in Table 4.

EXAMPLE 5

The color filter was produced by using the same procedure as Example 1, except that F-472SF (BM6) was used as the surfactant and inkjet R ink #2 was used as the ink during the production of the photosensitive resin composition. The jetting results of the ink are described in Table 4.

EXAMPLE 6

The color filter was produced by using the same procedure as Example 1, except that BYK307 (BM2) was used as the surfactant and inkjet R ink #3 was used as the ink during the production of the photosensitive resin composition. The jetting results of the ink are described in Table 4.

EXAMPLE 7

The color filter was produced by using the same procedure as Example 1, except that F-472SF (BM6) was used as the surfactant and inkjet R ink #4 was used as the ink during the production of the photosensitive resin composition. The jetting results of the ink are described in Table 4.

COMPARATIVE EXAMPLE 1

The color filter was produced by using the same procedure as Example 1, except that BYK330 (BM3) was used as the surfactant and R ink #1 was used as the ink during the production of the photosensitive resin composition. The jetting results of the ink are described in Table 4.

COMPARATIVE EXAMPLE 2

The color filter was produced by using the same procedure as Example 1, except that F-475 (BM7) was used as the surfactant and R ink #1 was used as the ink during the production of the photosensitive resin composition. The jetting results of the ink are described in Table 4.

COMPARATIVE EXAMPLE 3

The color filter was produced by using the same procedure as Example 1, except that the surfactant was not used (BM1) and R ink #2 was used as the ink during the production of the photosensitive resin composition. The jetting results of the ink are described in Table 4.

COMPARATIVE EXAMPLE 4

The color filter was produced by using the same procedure as Example 1, except that BYK330 (BM3) was used as the surfactant and R ink #2 was used as the ink during the production of the photosensitive resin composition. The jetting results of the ink are described in Table 4.

COMPARATIVE EXAMPLE 5

The color filter was produced by using the same procedure as Example except that F-475 (BM7) was used as the surfactant and R ink #2 was used as the ink during the production of the photosensitive resin composition. The jetting results of the ink are described in Table 4.

TABLE 1

Surface tension of the black matrix pattern depending on the type of used surfactant before plasma treatment (mN/m)

|  | BM 1 | BM 2 | BM 3 | BM 4 | BM 5 | BM 6 | BM 7 |
|---|---|---|---|---|---|---|---|
| Surfactant | X | BYK307 | BYK330 | BYK331 | F-177 | F-472SF | F-475 |
| Surface tension | 45.4 | 29.0 | 24.7 | 36.0 | 29.7 | 42.9 | 25.3 |

TABLE 2

Surface tension of color ink depending on the type of used surfactant (mN/m)

| Ink | Ink 1 | Ink 2 | Ink 3 | Ink 4 |
|---|---|---|---|---|
| Surfactant | F-475 | BYK330 | F-487 | BYK331 |
| Surface tension | 26.4 | 24.3 | 20.8 | 29.2 |

TABLE 3

Jetting results of ink in respects to the black matrix substrate before plasma surface treatment

| BM pattern | Color ink | Jetting result of ink |
|---|---|---|
| BM1 | Ink 1 | Filling was achieved with 5 drops and overflow occurs |
| BM2 | Ink 1 | Filling was achieved with 20 drops and overflow occurs |
| BM3 | Ink 1 | Filling was not achieved with 20 drops and overflow occurs |
| BM4 | Ink 1 | Filling was achieved with 5 drops and overflow occurs |
| BM5 | Ink 1 | Filling was achieved with 20 drops and overflow occurs |
| BM6 | Ink 1 | Filling was achieved with 5 drops and overflow occurs |
| BM7 | Ink 1 | Filling was not achieved with 30 drops and overflow occurs |
| BM1 | Ink 2 | Filling was achieved with 5 drops and overflow occurs |
| BM2 | Ink 2 | Filling was achieved with 20 drops and overflow occurs |
| BM3 | Ink 2 | Filling was not achieved with 20 drops and overflow occurs |
| BM4 | Ink 2 | Filling was achieved with 5 drops and overflow occurs |
| BM5 | Ink 2 | Filling was achieved with 20 drops and overflow occurs |
| BM6 | Ink 2 | Filling was achieved with 5 drops and overflow occurs |
| BM7 | Ink 2 | Filling was not achieved with 20 drops and overflow occurs |
| BM2 | Ink 3 | Filling was not achieved with 10 drops and overflow occurs |
| BM6 | Ink 4 | Filling was not achieved with 5 drops and overflow occurs |

TABLE 4

Jetting results of ink in respects to the black matrix substrate after plasma surface treatment

| Examples | BM pattern | Color ink | Jetting result of ink |
|---|---|---|---|
| Example 1 | BM5 | Ink 1 | Filling was achieved with 30 drops and overflow does not occur |
| Example 2 | BM2 | Ink 2 | Filling was achieved with 20 drops and overflow does not occur |
| Example 3 | BM4 | Ink 2 | Filling was achieved with 20 drops and overflow does not occur |
| Example 4 | BM5 | Ink 2 | Filling was achieved with 20 drops and overflow does not occur |
| Example 5 | BM6 | Ink 2 | Filling was achieved with 20 drops and overflow does not occur |
| Example 6 | BM2 | Ink 3 | Filling was achieved with 20 drops and overflow does not occur |
| Example 7 | BM6 | Ink 4 | Filling was achieved with 20 drops and overflow does not occur |
| Comparative Example 1 | BM3 | Ink 1 | Filling was not achieved with 40 drops and overflow does not occur |
| Comparative Example 2 | BM7 | Ink 1 | Filling was not achieved with 40 drops and overflow does not occur |
| Comparative Example 3 | BM1 | Ink 2 | Filling was achieved with 20 drops and overflow occurs |

TABLE 4-continued

Jetting results of ink in respects to the black
matrix substrate after plasma surface treatment

| Examples | BM pattern | Color ink | Jetting result of ink |
|---|---|---|---|
| Comparative Example 4 | BM3 | Ink 2 | Filling was not achieved with 30 drops and overflow does not occur |
| Comparative Example 5 | BM7 | Ink 2 | Filling was not achieved with 30 drops and overflow does not occur |

* The desirable number of drops in respects to the pixel unit: 20 to 30 drops

In Examples 1 to 7, if the black matrix pattern having the high surface tension in the range of about 29 mN/m or more was subjected to the hydrophobic surface treatment by using the plasma, when the ink having the low surface tension in the range of about 20 to 30 mN/m was jetted, the pixel unit was filled with an appropriate number of ink drops (20 to 30 drops) without an overflow.

On the other hand, in Comparative Examples 1, 2, 4, and 5, if the black matrix pattern having the low surface tension in the range of about 25 mN/m or less was subjected to the hydrophobic surface treatment by using the plasma, even though the ink having the low surface tension in the range of about 20 to 30 mN/m was jetted, the pixel unit was undesirably filled with an appropriate number of ink drops. In order to desirably fill the pixel unit, it is required to use the ink having the lower surface tension.

Furthermore, in Comparative Example 3, if the black matrix which did not contain the surfactant added to provide the ink repellency was subjected to the hydrophobic surface treatment by using the plasma, the pixel unit was filled with 20 drops of ink. If the more drops of ink are jetted, an overflow occurs. In particular, since the surfactant was not used, when the black matrix is coated with the photoresist, defectives may be formed due to the relatively high surface tension.

Therefore, even when the black matrix pattern having the high surface tension in the range of 26 to 45 mN/m was subjected to the hydrophobic surface treatment by using the plasma, if the color ink having the surface tension in the range of 20 to 30 mN/m was used, the appropriate number of ink drops was jetted without an overflow from a pixel unit to the adjacent pixel unit to perform the filling. When the black matrix pattern having the low surface tension in the range of 26 mN/m or less was subjected to the hydrophobic surface treatment by using the plasma, the color ink having the surface tension of less than 20 mN/m was used to jet the appropriate number of ink drops without an overflow from a pixel unit to the adjacent pixel unit. Thereby, the filling was performed.

The invention claimed is:

1. A method for producing a color filter, comprising:
    (a) forming a black matrix pattern having a surface tension of 26 to 45 mN/m on a substrate;
    (b) performing a plasma treatment of the substrate on which the black matrix pattern is formed; and
    (c) filling a pixel unit defined by the black matrix pattern by using an ink,
    wherein the plasma treatment is performed by using $CF_4$ gas,
    wherein the forming of the black matrix pattern comprises:
       (a1) applying a photosensitive resin composition on the substrate;
       (a2) prebaking the photosensitive resin composition to form a black matrix film; and
       (a3) selectively exposing and developing the formed black matrix film and then performing postbaking,
    wherein the ink has a surface tension of 20 to 30 mN/m, and wherein the surface tension of the formed black matrix pattern is higher than the surface tension of the ink.

2. The method for producing a color filter according to claim 1, wherein the photosensitive resin composition contains a coloring agent in an amount of 20 to 50 parts by weight based on 100 parts by weight of total solid amount of the photosensitive resin composition.

3. The method for producing a color filter according to claim 1, wherein the photosensitive resin composition contains a silicon or fluorine surfactant in an amount of 0.03 to 1.2 parts by weight based on 100 parts by weight of total solid amount of the photosensitive resin composition.

4. The method for producing a color filter according to claim 1, wherein the prebaking of the photosensitive resin composition is performed at 80 to 120° C. for 1 to 5 min.

5. The method for producing a color filter according to claim 1, wherein the postbaking is performed at 200 to 250° C. for 10 to 200 min.

6. The method for producing a color filter according to claim 1, wherein the formed black matrix pattern has an optical density of 3 to 6 when the black matrix pattern is 1.1 to 5 μm in thickness.

7. The method for producing a color filter according to claim 1, wherein the ink contains a silicon or fluorine surfactant in an amount of 0.01 to 0.1 parts by weight based on 100 parts by weight of the ink composition.

8. The method for producing a color filter according to claim 1, wherein the ink has a contact angle of 20 to 60 in respect to a surface of the black matrix pattern.

9. The method for producing a color filter according to claim 1, wherein the filling of the pixel unit is performed by using an inkjet printing process.

10. The method for producing a color filter according to claim 1, wherein the ink is a photo-curable or heat-curable ink.

11. The method for producing a color filter according to claim 10, wherein the photo-curable ink is cured by heat at a low temperature in the range of 50 to 150° C. for 10 to 2000 sec after each type of ink is discharged or all types of ink is discharged during the filling, exposed to light in an exposure dose of 40 to 300 $mJ/cm^2$, and cured by heat at a high temperature in the range of 200 to 250° C. for 10 to 200 min.

12. The method for producing a color filter according to claim 10, wherein the heat-curing ink is cured by heat at a low temperature in the range of 50 to 150° C. for 10 to 2000 sec after each type of ink is discharged or all types of ink is discharged during the filling, and cured by heat at a high temperature in the range of 200 to 250° C. for 10 to 200 min.

13. The method for producing a color filter according to claim 1, wherein the filling of the pixel unit is performed so that two or more types of ink are simultaneously or continuously applied.

14. A color filter produced by using the method according to claim 1.

15. A display device comprising the color filter of claim 14.

* * * * *